United States Patent Office 3,583,960
Patented June 8, 1971

3,583,960
PROCESS FOR POLYMERIZING VINYL MONOMERS
Yoshio Ishii and Shizuyoshi Sakai, Nagoya, Japan, assignors to Argus Chemical Corporation, Brooklyn, N.Y.
No Drawing. Original application Jan. 18, 1966, Ser. No. 521,402, now Patent No. 3,446,752, dated May 27, 1969. Divided and this application June 28, 1968, Ser. No. 753,313
Claims priority, application Japan, Jan. 21, 1965, 40/2,885
Int. Cl. C08f 3/56, 3/68, 3/90
U.S. Cl. 260—89.1
7 Claims

ABSTRACT OF THE DISCLOSURE

A process is provided for the redox polymerization of vinyl monomers using a redox polymerization system containing an oxazirane compound having at least one three-membered oxazirane ring containing from one to thirty carbon atoms, defined by the formula:

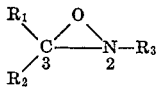

wherein $R_1$, $R_2$ and $R_3$ are hydrogen or organic hydrocarbon radicals having from one to about twenty carbon atoms, and a redox reducing agent.

---

This application is a division of application Ser. No. 521,402 filed Jan. 18, 1966, now Pat. No. 3,446,752, patented May 27, 1969.

This invention relates to a process for the polymerization of vinyl monomers, and more particularly, to a process for the redox polymerization of vinyl monomers, using oxaziranes as the oxidant component of redox polymerization systems.

In 1939 and 1940, it was discovered that certain reducing agents can be used with peroxide catalysts to give greatly accelerated rates of polymerization of vinyl compounds. U.S. Pat. No. 2,168,808 to F. K. Schoenfeld has been widely credited with stimulating this discovery. Schoenfeld reported that oxygen retarded vinyl chloride polymerization on heating with peroxide catalysts. It was quickly found that oxygen also inhibited the polymerization of methyl methacrylate, acrylonitrile and other active vinyl monomers. It was later demonstrated that polymerization and auto-oxidation are closely related, and that the polymerization behaviour can be dependent on very small amounts of molecular oxygen, peroxides, and antioxidant inhibitors, or reducing agents.

In the emulsion copolymerization of butadiene with hydrogen peroxide, for example, Stewart showed in U.S. Pats. Nos. 2,380,473, 2,380,474, 2,380,475, 2,380,476 and 2,380,477, that the polymerization can be greatly accelerated by including small amounts of a variety of reducing agents, such as ferrous ammonium sulfate, cuprous chloride, levulinic acid, beta-mercapto ethanol and other sulfur compounds and certain sterol compounds. Later patents disclosed as accelerators dicyandiamidine, iron salts with amino acid derivatives, or succinic acid, and sulfur compounds, along with hydrogen peroxide, sodium periodate, and potassium persulfate (U.S. Pats. Nos. 2,380,710, 2,388,372, 3,388,373, and 2,380,905).

Bacon and Morgan, British Pat. No. 573,366, increased the rate of polymerization of vinyl chloride in aqueous medium by the presence of a water-soluble persulfate, together with a water-soluble reducing agent as an activator. The most satisfactory reducing agents were found to be sulfur dioxide, alkali sulfites and bisulfites, sulfoxylates, hyposulfites, and thiosulfates.

Meunier and Vaissiere, Comp, rend., 206 677 (1938) showed that molecular oxygen inhibits or retards the polymerization of vinyl acetate when heated at temperatures below 120° C. Here, too, Bacon et al. British Pat. No. 574,449, and U.S. Pat. No. 2,497,828 showed that reduction activators such as sodium bisulfite make it possible to polymerize vinyl acetate emulsions at lower temperatures.

More extensive work was done by Bacon and Morgan with acrylonitrile, Trans. Far. Soc., 42 140 and 169 (1946), British Pat. No. 586,881, U.S. Pat. No. 2,370,010, British Pat. No. 578,209, U.S. Pat. No. 2,453,788. Using the combination of potassium persulfate and sodium bisulfite, Bacon was able to obtain a 90% conversion of acrylonitrile to polymer at 30° C. in thirty minutes. Among additional activators found useful by Bacon were the following compounds: sulfurous acid, sulfites, bisulfites, meta-sulfites, sulfoxylates, thiosulfates, hydrogen sulfide, hydroxylamine, hydrazine, polyhydric phenols (especially para and meta), acetone sodium bisulfite, formaldehyde sodium sulfoxylate, sulfonic acids, sulfoxides, hydroquinone, silver nitrate, copper or iron salts, and other lower valence salts of polyvalent metals.

Many types of per compounds have been used as the oxidizing components of such redox systems in the polymerization of all types of vinyl and related monomers, including, for example, hydrogen peroxide, peracetic acid, various persulfates, benzoyl peroxide, chloroacetyl peroxide, and cumene hydroperoxide. In addition to peroxides, aliphatic azo compounds have been used, such as $\alpha,\alpha'$-azodiisobutyronitrile, and other nitrogen-containing compounds that produce free radicals, such as benzyl hyponitrite, N-nitroso-acyl aryl amines and diazoaminobenzene. These form free-radical fragments with loss of nitrogen, British Pat. No. 618,168.

In the process of the instant invention, a vinyl monomer is polymerized under redox conditions, using a redox polymerization system consisting essentially of an oxazirane and a redox reducing agent. The oxazirane is the oxidizing component of the redox polymerization system. The reducing component of the catalyst system can be any of those known as reducing agents in such systems. Such redox catalyst systems are applicable to redox vinyl polymerizations of all kinds and are effective regardless of the polymerization method employed. The process is carried out at a temperature at which polymerization proceeds, but because of the activity of the catalyst system of the invention is particularly effective at low temperatures, within the range from 0° to about 80° C., under which conditions polyvinyl compounds or vinyl polymers are obtained having an improved crystallinity, stereoregularity, and mechanical properties, in exceptionally high yields.

The oxazirane compounds of the invention which are employed in these redox catalyst systems are defined by the formula:

(1) 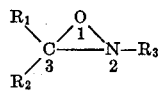

These oxaziranes are characterized by at least one three-membered ring made up solely of carbon, nitrogen and oxygen atoms. The substituents on this ring are represented by $R_1$, $R_2$, and $R_3$, which are hydrogen or organic hydrocarbon radicals having from one to about twenty carbon atoms, up to a total of about thirty carbon atoms in the oxazirane molecule. The $R_1$, $R_2$ and $R_3$ radicals can be aliphatic, cycloaliphatic or aromatic carbocyclic radicals, such as for example, alkyl, alkenyl, aryl, cycloalkyl, alkaryl, aralkyl, alkcycloalkyl, and cycloalkalkyl. $R_1$ and $R_2$ and $R_1$ or $R_2$ and $R_3$ can also be taken together to form a cycloalkyl ring, as cycloalkylene, or heterocyclic ring including the nitrogen. Also, two $R_3$'s and two or four of $R_1$ and $R_2$ can be taken together to form a dioxazirane, viz.:

(2) 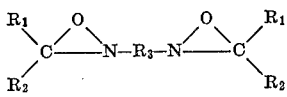

(3) 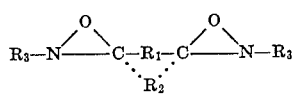

in which the R's are as before, in (1), but bivalent where shown in (2) and (3). Molecules containing up to five oxazirane rings linked by bivalent radicals of this type are contemplated by the invention.

Exemplary R hydrocarbon radicals are methyl, ethyl, n-propyl, isopropyl, n-butyl, isobutyl, sec-butyl, tert-butyl, n-amyl, isoamyl, sec-amyl, neopentyl, trimethylethyl, octyl, 2-ethylhexyl, isooctyl, nonyl, isononyl, decyl, dodecyl, undecyl, tetradecyl, octadecyl and eicosyl; allyl, butenyl, hexenyl, linolenyl, oleyl and octenyl; cyclopropyl, cyclobutyl, cyclopentyl, cyclohexyl, cycloheptyl, cyclooctyl, cyclododecyl, methylcyclohexyl, methylcyclopentyl, ethylcyclohexyl, diethylcyclobutyl, cyclohexylcyclohexyl, and tetrahydronaphthyl; benzyl, phenyl, α-phenethyl, β-phenethyl, xylyl, tolyl, ethylbenzyl, ethylphenyl, naphthyl, phenanthryl, bisphenyl, chrysenyl, fluorenyl, α- and β-naphthylethyl; and when $R_1$ and $R_2$ and $R_1$ and/or $R_2$ and/or $R_3$, are taken together tetramethylene, pentamethylene, and hexamethylene, phenylene, cyclohexylene, 1,4-dimethylene phenylene.

The oxaziranes used in the process in accordance with the invention are more stable than peroxides, such as hydrogen peroxide, and are safer to use. They are easily prepared in accordance with known procedures. In most cases, the best preparatory procedure is to oxidize the corresponding imine by a peracid such as peracetic acid or perbenzoic acid. The corresponding ketone or aldehyde can also be reacted with chloramine or hydroxylamine sulfonate in the presence of alkali. These reactions are illustrated by the following equations:

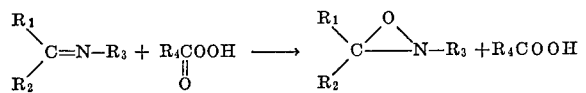

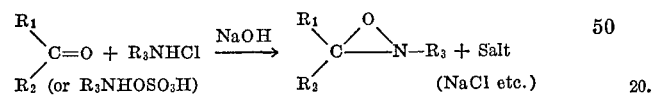

In the above formulae, $R_1$, $R_2$, and $R_3$ are as before. $R_4$ represents the radical of the peracid, and can be any of the hydrocarbon radicals defined above as $R_1$, $R_2$ and $R_3$.

The following oxaziranes are typical of those which can be employed in the redox catalyst systems used in the process of the invention:

1. 

2. 

3. 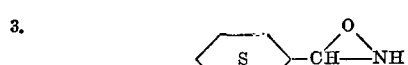

4. 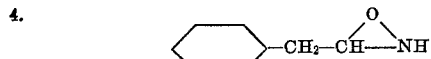

5. 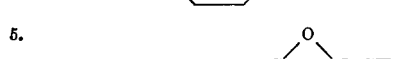

6. 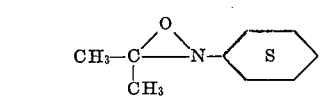

7. 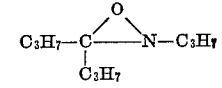

8. 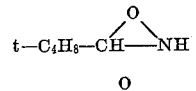

9. 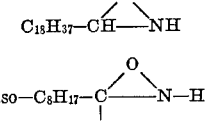

10. 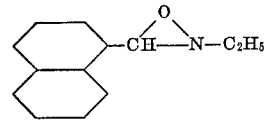

11. 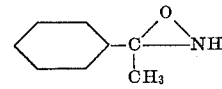

12. 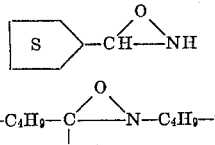

13. 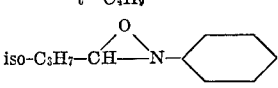

14. 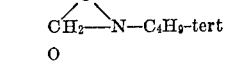

15. 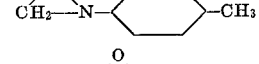

16.

17.

18. 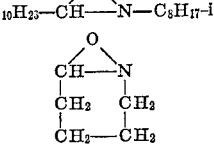

19.

20. 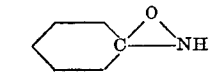

21. 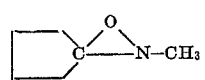

22.

23. 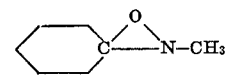

24. 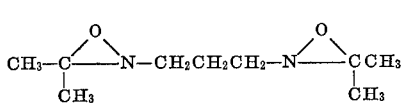

25. 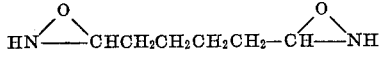

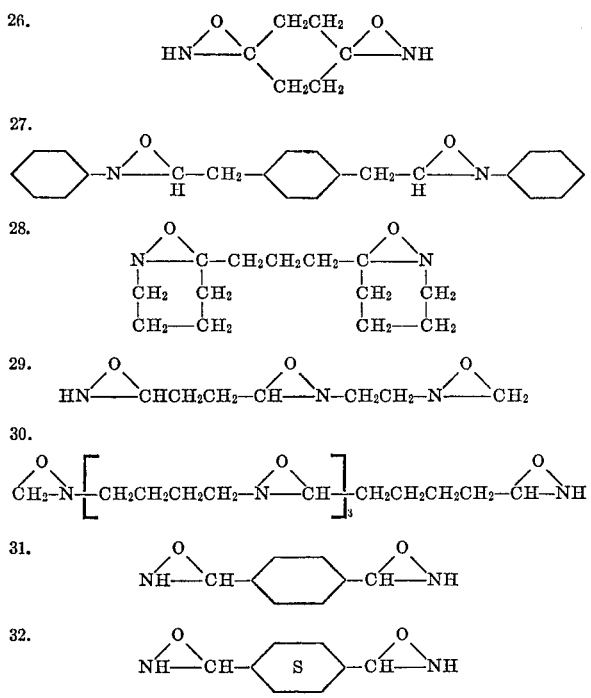

The oxazirane compounds used in the process of the invention can be employed in combination with any of the known redox reducing agents. Among these reducing agents there can be named as exemplary ferrous chloride, titanium dichloride, sodium acid sulfite, potassium acid sulfite, ascorbic acid, acetaldehyde, and other aldehydes, sulfurous acid, alkali metal sulfites, bisulfites, meta-sulfites, sulfoxylates, and thiosulfates, hydrogen sulfide, hydroxylamine, hydrazine, acetone sodium bisulfite, formaldehyde sodium sulfoxylate, sulfinic acids, copper or iron salts, other lower-valence salts of polyvalent metals, levulinic acid, reducing sugars such as glucose, β-mercaptoethanol, dicyandiamide, iron salts of amino acids, iron succinate, and copper sulfate pentahydrate.

The relative proportions of oxazirane compound and reducing compound are determined as is well known by empirical trial and error, using the vinyl monomer which it is desired to polymerize. The mechanisms involved in redox polymerizations are still not entirely understood, and will, of course, vary with the vinyl monomer, and the particular polymerization system to which the redox catalyst system is applied, as well as the reaction conditions. It is therefore customary to carry out several trial runs, in most instances, to determine the optimum proportions of oxazirane and redox reducing agent. In general, the relative proportions can be very widely varied within the range from about 0.1 to 10 moles of reducing compound per mole of oxazirane, without materially affecting the rate of polymerization, but the proportions will determine to some extent the properties of the finished polymer.

The redox polymerization system used in the process of the invention can be added to vinyl monomer at any stage of the polymerization, at the start, or at an intermediate stage, the advantageous effects on the course of the polymerization thereafter.

The polymerization will proceed over a wide range of temperatures. Satisfactory polymerizations are obtained at relatively low temperatures within the range from about —100° to about 80° C. At these temperatures, polymers are obtained which have an optimum degree of crystallinity, stereoregularity, and physical properties, and the reaction proceeds with high yields. Higher reaction temperatures can be employed, up to 100 or 120° C., according to the monomer. At excessively high temperatures, the polymerization may proceed at too high a rate, and will result in premature chain termination in many cases, so that a low molecular weight material is obtained. In any case, the polymerization is carried out at a temperature below that at which the properties of the polymer are adversely or deleteriously affected.

The reaction time is sufficient to effect polymerization in good yield. Usually, as little as ten minutes up to about five hours is adequate. At the lower reaction temperatures, longer reaction times may be necessary, and at temperatures of from about —100 to about 40° C. reaction times of from ten to fifty hours may be necessary. On the other hand, at elevated temperatures of the order of 80 to 120° C., reaction times as short as ten minutes, and in some cases even less, generally are more than adequate.

The relative proportion of redox polymerization system used in the process in accordance with the invention to vinyl monomer will depend upon the reaction conditions and the particular vinyl monomer. In general, an amount within the range from about 0.01 up to about 10% by weight of the vinyl monomer is sufficient. Usually, amounts within the range from 0.1 to about 2% give optimum results, and are preferred. Amounts in excess of about 10% can be used, but do not normally improve the yield or the quality of the polymer, and consequently may be wasteful.

The reaction can be carried out in accordance with any of the known techniques in this art. Photopolymerization, suspension or granular polymerization, emulsion polymerization, polymerization in casting liquids, polymerizations in solution in an inert organic solvent, and polymerization in bulk in the absence of any solvents or diluents, all can effectively be carried out using the process of the invention. Some polymerization techniques are more effective with certain monomers than are others. For example, emulsion and suspension techniques are presently preferred in the polymerization of vinyl chloride homopolymers and copolymers with other vinyl monomers. Inasmuch as the particular polymerization technique forms no part of the invention, it is unnecessary to give further details. This aspect of the invention is illustrated in the working examples, so as to suggest the types of reactions that can be utilized.

The invention is applicable to any type of vinyl monomer and related monomers, including, for example, styrene; divinylbenzene; diallyl phthalate; diallyl maleate, allyl furoate; combinations of styrene with other monomers, such as styrene-1,4-divinyl-2,3,5,6-tetrachlorobenzene, styrene-methacrylic anhydride, styrene-vinyl crotonate, styrene-1,3,5-trivinylbenzene, styrene-acrylonitrile, styrene-methylmethacrylate; styrene-vinylidene chloride, and styrene-butadiene systems; methacrylic acid, acrylic acid, their esters, amides and salts, such as methyl acrylate, lauryl acrylate, octadecyl methacrylate, acrylamide, ethyl acrylate, amyl acrylate, methyl methacrylate, sodium acrylate, and mixtures thereof with other polyfunctional and monofunctional monomers, such as ethylene dimethacrylate, methylene dimethacrylate, diallylphthalate, crotylmethacrylate, diallyl maleate, cyclohexyl methacrylate, acrylonitrile and acrylic acid monomers, and copolymers formed with other monomers, such as itaconic acid, methyl acrylate, chlorotrifluoroethylene, vinyl acetate, vinyl chloride, and isobutylene; vinyl acetate, vinyl 2-ethylhexoate, vinyl octoate and vinyl stearate; copolymers formed from mixtures of vinyl acetate and vinyl stearate, vinyl acetate and vinyl chloride, vinyl acetate and maleic anhydride, vinyl acetate and methylacrylate, vinyl acetate and allyl chloride, vinyl acetate and ispropenyl acetate, vinyl acetate and methallyl chloride, vinyl acetate and styrene, vinyl acetate and vinylidene chloride; vinyl chloride and mixtures of vinyl chloride with vinyl bromide, vinyl fluoride, and vinyl iodide; vinyl alkyl ethers, such as vinyl isobutyl ether, vinyl cetyl ether, vinyl dodecyl ether and vinyl tetradecyl ether; vinylidene chloride, and copolymers of vinylidene chloride with other monomers, such as chlorotrifluoroethylene, tetrafluoroethylene, and other polyhaloethylene, vinyl chloride, vinyl acetate, acrylonitrile, and ethyl acrylate; acrylonitrile, and copolymers thereof formed with other monomers such as methyl acrylate and N-vinyl carbazole; ethylene, propylene, isobutylene, chloroprene, butadiene, and various copolymers formed from isobutylene, isoprene, isobutylene and butadiene, isobutylene and 2-ethylbutadiene-1,3, and the like materials. Those skilled in the art will perceive other applications of the process from the above enumeration of vinyl monomers. Terpolymerizations and other polymerizations comprising three or more monomers mentioned above are also possible.

The polymers obtained using process of the invention are in general known polymers, which may have improved properties because of the special functional properties of the oxazirane in combination with the redox reducing agent.

The invention is illustrated by the following examples, which in the opinion of the inventors represent preferred embodiments of their invention.

EXAMPLE 1

Twenty-four parts of ethanol, 3 parts of methyl methacrylate, 1 mole percent of 2-tert-butyl-3-isopropyl-oxazirane, and 1 mole percent ferrous chloride per mole of the methyl methacrylate were mixed under an oxygen-free atmosphere. Polymerization was then carried out at $-35°$ C. for twenty-four hours. The polymer that was obtained was precipitated by addition of ethanol to the cold reaction mixture. The precipitate was separated and dried. A 41% yield of polymethyl methacrylate was obtained.

In a control, under exactly the same conditions, carried out using 1 mole percent hydrogen peroxide instead of the oxazirane, a 2% yield was obtained. This shows the effectiveness of the oxaziranes in the process of the invention in reducing the temperature at which polymerization can be effected.

EXAMPLES 2 TO 10

A series of polymerizations of acrylamide was carried out, employing water as the reaction solvent, 0.025 to 1 mole percent of the 2-tert-butyl-3-isopropyl-oxazirane of Example 1, and 0.025 to 1 mole percent of ferrous chloride, per mole of the acrylamide. The reaction temperature is noted in Table I which follows, and the reaction time also is noted in the table, together with the yield.

percent, and the reaction temperature can range from $-15$ to $+40°$ C. Under these conditions, good yields are obtained in from fifteen minutes to one hour's reaction time.

EXAMPLE 11

A series of three polymerizations was carried out, A, B and C, using methyl methacrylate as the vinyl monomer in Example 11, with 2-tert-butyl-3-isobutyl-oxazirane combined with ferrous chloride, and in the Control with hydrogen peroxide combined with ferrous chloride, for purposes of comparison. In each case, 1 mole percent of the oxidizing agent per mole of the methyl methacrylate and 1 mole percent of ferrous chloride per mole of the methyl methacrylate was used as the redox catalyst system. The reaction temperatures ranged from $-78$ to $+27°$ C. The results are given in Table II. The reaction times are given in the table, together with the yield and nature of the polymer.

TABLE II

| Run No. | Temperature, °C. | Time, minutes | Example 11, oxazirane | | Control, H$_2$O$_2$ | |
|---|---|---|---|---|---|---|
| | | | Yield, percent | Syndiotacticity, percent | Yield, percent | Syndiotacticity, percent |
| A | 27.0 | 9.0 | 27.4 | 71 | 26.3 | 72 |
| B | $-35$ | 24.7 | 27.1 | 78 | 1.0 | 78 |
| C | $-78$ | 72.0 | 12.8 | 88 | 2.0 | 82 |

The syndiotacticity of this product was calculated from the absorption intensity of infrared light at 1069 cm.$^{-1}$. Thus, the polymethyl methacrylate obtained was of excellent crystallinity. The yields obtainable using the oxazirane are clearly superior, especially at the lower temperatures.

EXAMPLE 12

One hundred parts by weight of methyl methacrylate, 1 mole percent per mole of the methyl methacrylate of 2-tert-butyl-3-isopropyl-oxazirane, and 2 mole percent of butyraldehyde were mixed under a nitrogen atmosphere and bulk-polymeribed at $35°$ C. for ten hours. The polymer was precipitated by addition of methanol, and the precipitate was dried at $60°$ C. under a vacuum of 15 mm. of mercury. 70 parts by weight of polymethyl methacrylate was obtained.

The syndiotacticity of this product was calculated from the absorption intensity of infrared light at 1069 cm.$^{-1}$, and was found to be 70%. Thus, the polymethyl methacrylate obtained was of excellent crystallinity.

TABLE I
[Polymerization (monomer concentration two moles/liter)]

| Example Number: | Monomer | Solvent | Oxazirane[1] (mole percent) | FeCl$_2$[1] mole percent | Temperature, °C. | Time, minutes | Yield percent |
|---|---|---|---|---|---|---|---|
| 2 | Acrylamide | Water | 1.00 | 1.00 | 40 | 15 | 86.6 |
| 3 | do | do | 1.00 | 1.00 | 40 | 30 | 88.2 |
| 4 | do | do | 1.00 | 1.00 | 40 | 60 | 84.2 |
| 5 | do | do | 0.25 | 0.25 | 40 | 15 | 88.9 |
| 6 | do | do | 0.025 | 0.025 | 0 | 40 | 0.1 |
| 7 | do | do | 0.025 | 0.025 | 0 | 90 | 14.0 |
| 8 | do | do | 0.025 | 0.015 | 0 | 150 | 72.9 |
| 9 | do | Water containing ethylene glycol.[2] | 1.00 | 1.00 | $-15$ | 30 | 99.9 |
| 10 | do | do[2] | 1.00 | 1.00 | $-30$ | 20 | 94.29 |

[1] Mole percent to monomer, per mole.
[2] 10 ml. H$_2$O plus 90 ml. ethylene glycol.

It is apparent from the results in Table I that optimum yields are obtained at temperatures below 0° C. At 40° C., excellent yields are obtainable, however. Good yields are obtained over a wide variety of proportions of catalyst, ranging from 0.25% of the oxazirane and ferrous chloride in Example 5, to 1% in Examples 2 to 4 and 9 and 10. At the very small amount of 0.025% oxazirane and ferrous chloride catalyst, a good yield is obtained only after a rather long reaction time, 2½ hours in Example 8. The data accordingly show that for optimum results, the amount of catalyst should be at least 0.25 mole

EXAMPLE 13

Twenty-five parts by weight of vinyl acetate, 100 parts by weight of water, 2 parts by weight of sodium oleate, and 1 part by weight of 2-tert-butyl-3,3-dimethyl-oxazirane were mixed after removal of air by reduced pressure. 1 part by weight of sodium acid sulfite was then added, with stirring, under a nitrogen atmosphere. Polymerization was carried out in this emulsion at 10° C. for ten hours. The polymer was separated by adding calcium chloride, and the precipitate was then dried at 60° C. under a vacuum of 15 mm. of mercury. 18.5 parts of polyvinyl acetate was obtained of good crystallinity.

EXAMPLE 14

Three parts by weight of methyl acrylate, 17 parts by weight of ethanol, 1 mole percent per mole of the methyl acrylate of 3-butyl-2-methyl-oxazirane, and 1 mole percent of ferrous chloride per mole of the methyl acrylate, were mixed in the absence of oxygen, and polymerization was carried out at −50° C. with stirring for five days. The polymer was precipitated by addition of hexane, and the precipitate was dried at 60° C. under vacuum. A 36% yield of poly(methyl acrylate) was obtained.

EXAMPLE 15

Five parts by weight of methyl methacrylate, 15 parts by weight of methanol, and 0.075 part by weight of 2-isobutyl-3,3-dimethyl-oxazirane were mixed. Air was removed, and then 0.05 part by weight of sodium acid sulfite was added. Polymerization was carried out with stirring at −78° C. for three days. A 10% yield of polymethyl methacrylate was obtained. The syndiotacticity of this product was determined as 83%, using the technique of Example 12.

Having regard to the foregoing disclosure, the following is claimed as the inventive and patentable embodiments thereof:

1. A process for the redox polymerization of vinyl monomers which comprises polymerizing the monomer at a temperature within the range from about −100 to about 120° C. in the presence of an amount within the range from about 0.01 up to about 10% by weight of the vinyl monomer of a redox polymerization system comprising an oxazirane compound having at least one three-membered oxazirane ring having from one to about thirty carbon atoms, defined by the formula:

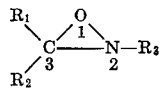

wherein $R_1$, $R_2$ and $R_3$ are selected from the group consisting of hydrogen and organic hydrocarbon radicals having from one to about twenty carbon atoms, and a redox reducing agent, in an amount of from about 0.1 to about 10 moles per mole of oxazirane.

2. A process in accordance with claim 1, in which the oxazirane is defined by the formula:

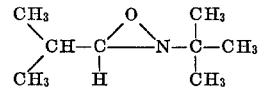

3. A process in accordance with claim 2, wherein the hydrocarbon radicals are selected from the group consisting of alkyl, alkenyl, alkylene, arylene, cycloalkyl, cycloalkylene, alkaryl, alkarylene, aralkyl, aralkylene, alkcycloalkyl, alkcycloalkylene, cycloalkalkyl, and cycloalkalkylene.

4. A process in accordance with claim 1, wherein the oxazirane has from one to five oxazirane groups.

5. A process in accordance with claim 1, in which the polymerization is effected at a temperature within the range from about −100 to about 40° C.

6. A process in accordance with claim 4, in which the polymerization is carried out at a temperature within the range from about 0 to about 80° C.

7. A process in accordance with claim 1, in which the total amount of the oxazirane and redox reducing agent is within the range from about 0.1 up to about 2% by weight of the vinyl monomer.

References Cited

UNITED STATES PATENTS 2,647,878   8/1953   Lee _____ 260—85.5N
3,446,752   5/1969   Ishii et al. _____ 260—89.7

HARRY WONG, JR., Primary Examiner

U.S. CL. X.R.

252—426, 428, 429; 204—159.23; 260—78.4, 78.5, 82.1, 84.7, 85.5, 85.7, 86.1, 86.3, 86.7, 87.1, 87.3, 87.5, 87.7, 88.1, 88.2, 88.7, 89.5, 89.7, 91.1, 91.7, 92.3, 92.8, 93.5, 94.8, 84.9

PO-1050
(5/69)

UNITED STATES PATENT OFFICE
CERTIFICATE OF CORRECTION

Patent No. 3,583,960            Dated June 8, 1971

Inventor(s) YOSHIO ISHII et al.

It is certified that error appears in the above-identified patent and that said Letters Patent are hereby corrected as shown below:

Column 1, line 67    :    "3,388,373" should be -- 2,388,373 --

Column 6, line 39    :    After "the", add -- instant --

Column 7, Table I,
Example 8              :    "0.015" should be -- 0.025 --

Column 7, Table I,
Example 10            :    "94.29" should be -- 94.2 --

Column 8, line 40    :    "polymeribed" should be -- polymerized --

Signed and sealed this 21st day of March 1972.

(SEAL)
Attest:

EDWARD M. FLETCHER, JR.           ROBERT GOTTSCHALK
Attesting Officer                   Commissioner of Patents